(12) United States Patent
Maertens

(10) Patent No.: US 11,946,406 B2
(45) Date of Patent: Apr. 2, 2024

(54) DEVICE FOR ELECTRICALLY HEATING AN EXHAUST GAS CATALYST

(71) Applicant: Vitesco Technologies GmbH, Regensburg (DE)

(72) Inventor: Steven Maertens, Toulouse (FR)

(73) Assignee: Vitesco Technologies GmbH (DE)

( * ) Notice: Subject to any disclaimer, the term of this patent is extended or adjusted under 35 U.S.C. 154(b) by 0 days.

(21) Appl. No.: 17/928,360

(22) PCT Filed: Jun. 2, 2021

(86) PCT No.: PCT/EP2021/064812
§ 371 (c)(1),
(2) Date: Nov. 29, 2022

(87) PCT Pub. No.: WO2021/254780
PCT Pub. Date: Dec. 23, 2021

(65) Prior Publication Data
US 2023/0212970 A1 Jul. 6, 2023

(30) Foreign Application Priority Data
Jun. 15, 2020 (FR) ........................................ 2006195

(51) Int. Cl.
*F01N 3/00* (2006.01)
*F01N 3/08* (2006.01)
*F01N 3/10* (2006.01)
*F01N 3/20* (2006.01)

(52) U.S. Cl.
CPC .......... *F01N 3/0814* (2013.01); *F01N 3/101* (2013.01); *F01N 3/103* (2013.01); *F01N 3/2013* (2013.01);
(Continued)

(58) Field of Classification Search
CPC ........ F01N 3/0814; F01N 3/101; F01N 3/103; F01N 3/2013; F01N 3/2026; F01N 3/2066; F01N 2240/16
See application file for complete search history.

(56) References Cited

U.S. PATENT DOCUMENTS 5,456,890 A * 10/1995 Tsai ...................... F01N 3/2013
502/527.22
5,529,759 A * 6/1996 Sanada ................. F01N 3/2821
422/177
(Continued)

FOREIGN PATENT DOCUMENTS

DE 102016122304 A1 5/2018
WO 2018108775 A1 6/2018
WO 2019011842 A1 1/2019

OTHER PUBLICATIONS

English Translation of Written Opinion for International Application No. PCT/EP2021/064812, dated Oct. 7, 2021, 7 pages.
(Continued)

*Primary Examiner* — Matthew T Largi
(74) *Attorney, Agent, or Firm* — Buchanan Ingersoll & Rooney PC

(57) ABSTRACT

An electric heating device for an exhaust gas catalyst, the electric heating device including a sleeve and a heating cellular structure which is heated by a flow of electric current and which is contained in the sleeve. The electric heating device being designed to be positioned in a segment of an exhaust gas pipe upstream of a catalyst, so as to completely occupy a cross section of the segment such that exhaust gases flowing in the pipe pass through the cellular matrix before reaching the catalyst. The heating cellular structure is designed to dissipate an inhomogeneous thermal power in a section perpendicular to the direction of flow of the exhaust gases, such that the temperature of the exhaust gases at the outlet of the heating cellular structure is homogeneous in a section perpendicular to the direction of flow of the exhaust gases.

8 Claims, 3 Drawing Sheets

(52) U.S. Cl.
 CPC ......... *F01N 3/2026* (2013.01); *F01N 3/2066* (2013.01); *F01N 2240/16* (2013.01)

(56) References Cited

U.S. PATENT DOCUMENTS

| | | | | |
|---|---|---|---|---|
| 5,672,324 | A * | 9/1997 | Okamoto | B01J 35/04 |
| | | | | 422/174 |
| 6,562,305 | B1 * | 5/2003 | Swars | B32B 15/04 |
| | | | | 422/177 |
| 9,623,373 | B2 * | 4/2017 | Brueck | F01N 3/2026 |
| 10,900,400 | B2 | 1/2021 | Hirth et al. | |
| 11,274,590 | B2 | 3/2022 | Paukner et al. | |
| 2010/0133251 | A1 * | 6/2010 | Konieczny | F01N 3/281 |
| | | | | 219/202 |
| 2010/0205943 | A1 | 8/2010 | Gonze et al. | |
| 2011/0259190 | A1 | 10/2011 | Gonze et al. | |
| 2017/0226910 | A1 | 8/2017 | Tsurumi et al. | |
| 2017/0362982 | A1 | 12/2017 | Miao et al. | |
| 2018/0185789 | A1 * | 7/2018 | Crawford | F01N 13/0097 |
| 2019/0316507 | A1 * | 10/2019 | Ottaviani | B01D 53/94 |

OTHER PUBLICATIONS

International Search Report and Written Opinion for International Application No. PCT/EP2021/064812, dated Oct. 7, 2021, 8 pages.
International Search Report and Written Opinion for International Application No. PCT/EP2021/064812, dated Oct. 7, 2022 (French), 12 pages.

* cited by examiner

Fig. 1          Prior Art
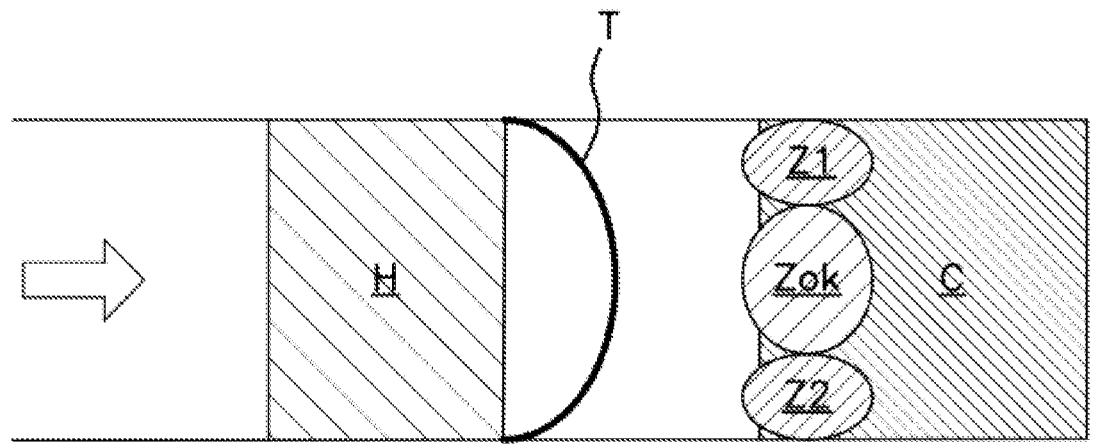
Fig. 2
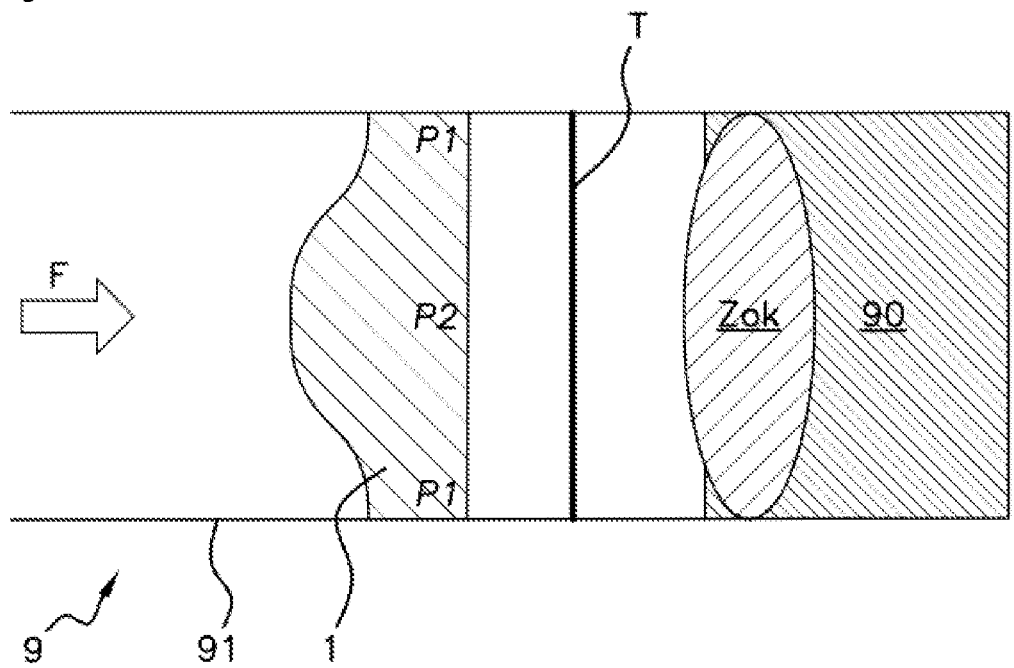

DEVICE FOR ELECTRICALLY HEATING AN EXHAUST GAS CATALYST

CROSS REFERENCE TO RELATED APPLICATIONS

This application is the U.S. National Phase Application of PCT International Application No. PCT/EP2021/064812, filed Jun. 2, 2021, which claims priority to French Patent Application No. 2006195, filed Jun. 15, 2020, the contents of such applications being incorporated by reference herein.

FIELD OF THE INVENTION

The present application relates to an electric heating device for an exhaust gas catalyst, said electric heating device being positioned upstream of the catalyst in an exhaust pipe and being designed to heat the exhaust gases so as to bring them to an effective catalysis temperature.

BACKGROUND OF THE INVENTION

A three-way catalyst of a gasoline vehicle has an effective operating range for temperatures greater than 400° C., whereas a pollution control system for diesel vehicles operates effectively from about 180° C. A pollution control system for diesel vehicles typically comprises an oxidation catalyst which treats hydrocarbons HC and carbon monoxide CO, a selective catalytic reduction catalyst which treats nitrogen oxides NOx, and a particulate filter.

When the engine is cold-started, the temperature of the exhaust gases is initially low and a certain amount of time is required for it to increase until an effective operating value of the catalyst is reached. This implies that the exhaust gases are not correctly filtered by the catalyst for the entire period of time in which these gases have too low of a temperature.

The same problem exists for diesel engines which take longer to heat than gasoline engines, such that if the driver drives at low speed, with a lightly loaded vehicle, the exhaust gases may remain at a temperature lower than an effective catalysis temperature for a potentially long duration. This problem of an exhaust gas temperature lower than the effective temperature may also arise if, after extra-urban driving, a return is made to urban driving with a low load.

Also for hybrid vehicles, the combustion engine cools down when the electric motor is in operation for long periods of time, and the same problem regarding exhaust gas temperature arises when the combustion engine is restarted.

In order to resolve this problem, it is known to position a heating device upstream of the catalyst. This heating device may take the form of a sleeve disposed in an exhaust pipe of the engine, and containing a heating cellular matrix through which the gases pass to be heated therein before reaching the catalyst.

A problem associated with this type of device is that the temperature of the exhaust gases at the inlet of the matrix, in a section perpendicular to the direction of flow of the gases, is not homogeneous. FIG. 1 schematically shows a catalysis system of the prior art which is arranged in an exhaust pipe and which comprises a catalyst C and, upstream of the latter, a heating device H.

For example and as shown in this figure, the gases may be cooler at the periphery of the pipe than at the center, owing to the influence of the ambient temperature outside the gas pipe, the thermal inertia of the pipes and the distribution of gases at the outlet of the engine or of the turbocharger. There may be other profiles depending on the configuration of the engine. This results in a temperature profile T that is also inhomogeneous downstream of the heating device, and consequently the exhaust gases arriving at the catalyst may, in certain locations, have a temperature lower than the effective catalysis temperature in spite of the heating effected. This is the case in zones Z1 and Z2 which are illustrated on either side of the zone Zok which represents a zone in which the temperature of the exhaust gases is greater than or equal to the effective catalysis temperature.

SUMMARY OF THE INVENTION

An aspect of the invention aims to overcome the drawbacks of the prior art described above.

In particular, an aspect of the invention is a heating device which makes it possible to increase the filtering effectiveness of a catalyst and to decrease the harmful emissions of a vehicle.

In this regard, an aspect of the invention proposes an electric heating device for an exhaust gas catalyst, the electric heating device comprising a sleeve and a heating cellular structure which is heated by a flow of electric current and which is contained in the sleeve, the electric heating device being designed to be positioned in a segment of an exhaust gas pipe upstream of a catalyst, so as to completely occupy a cross section of said segment such that exhaust gases flowing in the pipe pass through the cellular matrix before reaching the catalyst, the electric heating device being characterized in that the heating cellular structure is designed to dissipate an inhomogeneous thermal power in a section perpendicular to the direction of flow of the exhaust gases, such that the temperature of the exhaust gases at the outlet of the heating cellular structure is homogeneous in a section perpendicular to the direction of flow of the exhaust gases.

In one embodiment, the cellular structure comprises a peripheral portion designed to dissipate a first thermal power P1, and a central portion designed to dissipate a second thermal power P2, and wherein the first thermal power P1 is greater than the second thermal power P2.

In one embodiment, the heating cellular structure is composed of at least two materials having different electrical resistivities.

In one embodiment, the cellular structure is obtained by winding a heating cellular panel about an axis corresponding to the direction of flow of the exhaust gases when the heating device is positioned in the exhaust pipe, and wherein the cellular panel has, along this axis, a variable dimension.

In one embodiment, the heating cellular panel may have at least one first portion designed to form, once the plate has been wound, a peripheral portion of the cellular structure, and at least one second portion designed to form, once the plate has been wound, a central portion of the cellular structure, and said at least one first portion has a smaller dimension, in the direction of the axis of winding, than the dimension of the second portion.

In one embodiment, the heating device further comprises a catalysis element disposed in the sleeve, downstream of the heating cellular structure with respect to the direction of flow of the exhaust gases.

In one embodiment, the catalysis element is of the oxidation, LNT, or three-way catalyst type.

Another aspect of the invention is a catalysis assembly for exhaust gas, comprising at least one catalyst and an electric heating device according to the preceding description, wherein the catalyst is selected from among the group consisting of:

a three-way catalyst,
an oxidation catalyst,
an LNT catalyst,
a selective catalytic reduction catalyst.

An aspect of the invention also relates to a vehicle comprising a combustion engine, an exhaust pipe for exhaust gases produced by combustion in the combustion engine, a catalyst disposed in the exhaust pipe, and an electric heating device according to the preceding description disposed in the exhaust pipe, upstream of the catalyst with respect to the direction of flow of the exhaust gases in the exhaust pipe.

An aspect of the invention lastly relates to a method for designing a heating device according to the preceding description, comprising the measurement of an exhaust gas temperature profile in a section of an exhaust pipe upstream of a catalyst, the determination of a profile of thermal power to be dissipated in a section of the exhaust pipe upstream of the catalyst so as to obtain a constant temperature profile at the inlet of the catalyst, and the definition of zones of the heating cellular matrix of a heating device and the thermal power that can be dissipated by each zone, such that the heating of the exhaust gases by the heating cellular matrix makes it possible to obtain a constant temperature profile of the exhaust gases at the inlet of the catalyst.

The proposed aspect of the 24 invention makes it possible to obtain, at the catalyst inlet, a homogeneous exhaust gas temperature profile, making it possible for the exhaust gases to be at the effective operating temperature of the catalyst across the entire section of the exhaust pipe, this therefore improving the effectiveness of the catalysis.

BRIEF DESCRIPTION OF THE DRAWINGS

Further features, details and advantages will become apparent on reading the following detailed description, and on studying the appended drawings, in which:

FIG. 1, already described, schematically shows a catalysis system according to the prior art.

FIG. 2 schematically shows a catalysis system according to one embodiment of the invention.

DETAILED DESCRIPTION OF THE EMBODIMENTS

With reference to FIG. 2, a description will now be given of an electric heating device 1 which forms part of a catalysis assembly 9 for a vehicle comprising a combustion engine (not shown), the combustion engine being of the gasoline or diesel type. The catalysis assembly comprises a catalyst 90 which is disposed in an exhaust pipe 91 for gases generated by combustion in the engine, and which is designed to filter the exhaust gases before they are discharged into the atmosphere.

Depending on the nature of the engine, the catalyst may be a three-way catalyst (typically for gasoline engines) which reduces nitrogen oxides, oxidizes carbon monoxides, and oxidizes unburned hydrocarbons. It may also be an oxidation catalyst (DOC) for oxidizing CO and HC, or an LNT (Lean NOx Trap) catalyst which is both an oxidation catalyst and a catalyst for storing and reducing NOx, or a selective catalytic reduction catalyst, or an assembly comprising an oxidation catalyst followed by a selective catalytic reduction catalyst, etc.

Figure 3:
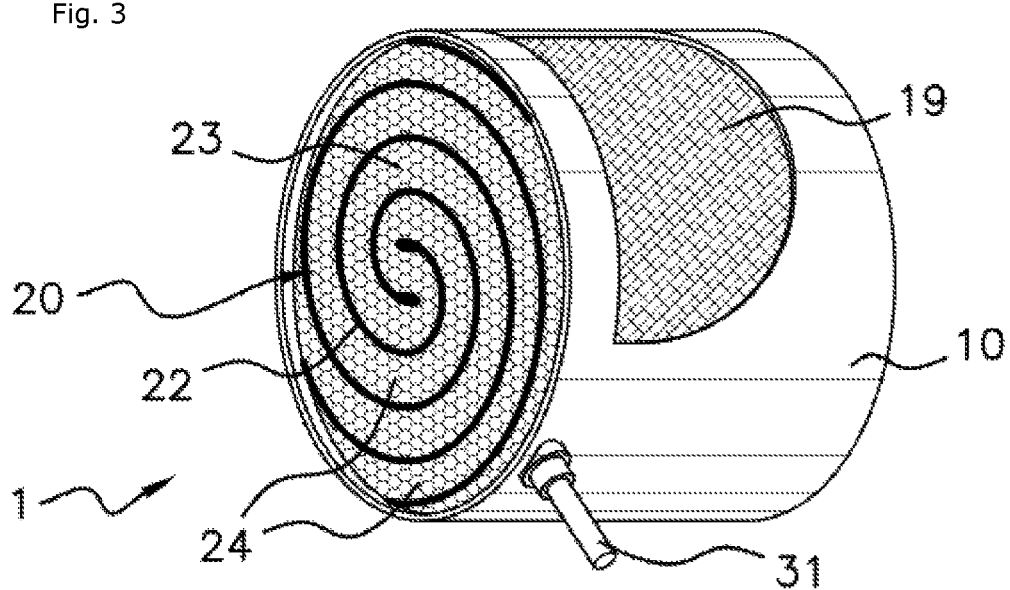
FIG. 3 shows an example of a heating device.

The electric heating device 1 is disposed in the exhaust pipe 91, upstream of the catalyst 90, that is to say between the outlet of the engine and the inlet of the catalyst. With reference to FIG. 3, the electric heating device 1 comprises a cylindrical sleeve 10 and a heating cellular structure 20 which is heated by a flow of electric current and which is contained in the sleeve.

The external diameter of the cylindrical sleeve 10 may correspond to the internal diameter of the exhaust pipe 91 such that the heating device can be positioned in a segment of the exhaust gas pipe 91 so as to completely occupy a cross section of said segment. Thus, the produced gases, by way of the sleeve, necessarily pass through the heating cellular structure 20 before arriving at the catalyst.

The heating device also comprises a support device for supporting the heating cellular structure in the sleeve, comprising, for example, a support structure 19 which is accommodated in the sleeve 10, for example downstream of the heating cellular structure, and holding pads 24 which hold the heating cellular structure against the support structure.

In one embodiment, and as illustrated for example in FIG. 3, the support structure 19 may have a supplementary catalysis element function, such that the heating device 1 comprises a supplementary catalysis element 19 in relation to the catalyst 90 described above. The catalysis element 19 may be of the oxidation (DOC) or LNT catalyst type, or of the three-way catalyst type.

In one embodiment, the catalysis element 19 is of the same type as the catalyst 90 in order to increase the effectiveness of that type of catalyst. As a variant, it is of a different type so as to provide a complementary treatment of the exhaust gases by the catalysis element 19 of the electric heating device 1 and by the catalyst 90. By way of non-limiting example, the catalysis element may be of the three-way type, whereas the catalyst 90 is of the selective catalytic reduction type.

Figure 4A:
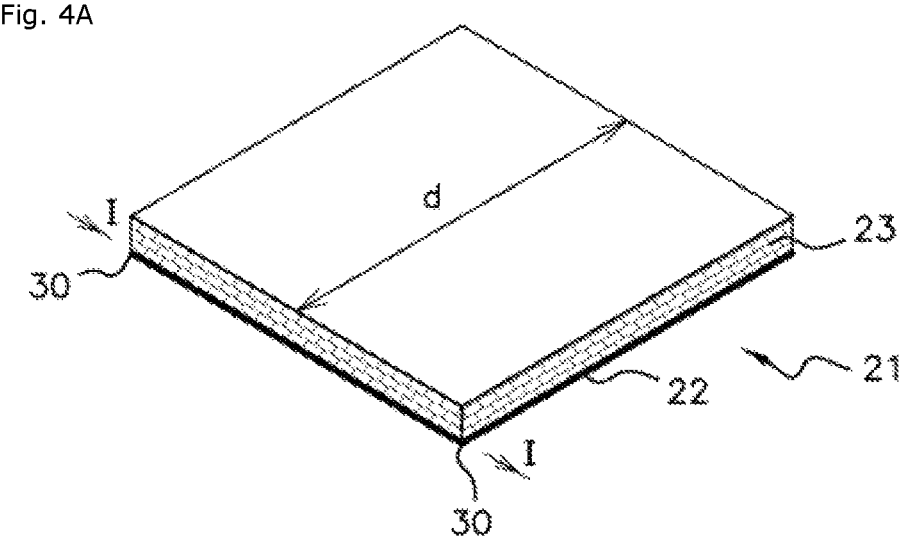
FIG. 4A schematically shows an example of the structure of a heating device.
Figure 4B:
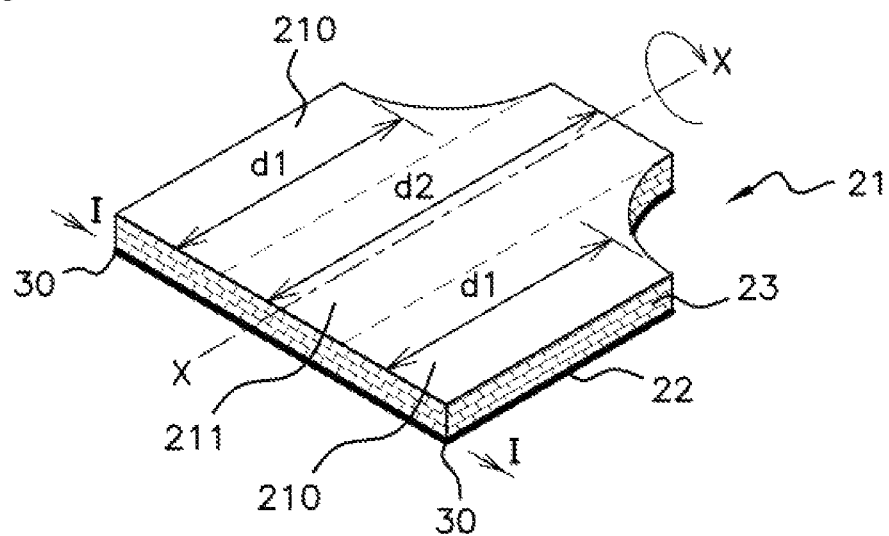
FIG. 4B schematically shows another example of a heating device.

The heating cellular structure 20 may be obtained by winding a heating cellular panel 21 about an axis which, when the heating device is installed, is parallel to the direction of movement of the gases in the exhaust pipe (shown by the arrow F in FIG. 2). The panel 21, examples of which are shown in FIGS. 4A and 4B, comprises at least one metallic cellular matrix 23, which may be attached to a support layer 22 that is also metallic, or which may even be positioned between two support layers 22. A cellular matrix 23 is understood to mean a formation comprising a plurality of cells through which the exhaust gases can pass, the cells being delimited by metallic walls which are heated during the flow of an electric current. The heating cellular structure 20 also comprises electrical connectors 30 making it possible to cause a current to flow through the cellular structure in order to heat it. The structure is arranged in such a way that a first end of the metallic support wall is connected to a first electrical connector and a second end of the metallic support wall is connected to a second electrical connector, such that the current flows in the entirety of the metallic support wall and the cellular matrix mounted on the wall.

The flow of current in the metallic support wall, and in the cellular matrix, makes it possible to heat the exhaust gases by Joule effect.

The sleeve may also comprise connection pads 31 making it possible to receive the electrical connectors 30 of the cellular structure and hold them in a fixed position, such that they can be connected to a current generator via appropriate connectors.

Returning to FIG. 2, the cellular structure 20 is designed to dissipate an inhomogeneous thermal power in a section perpendicular to the direction of flow of the exhaust gases, such that the temperature of the exhaust gases at the outlet of the electric heating device is homogeneous in said section, and therefore homogeneous at the inlet of the catalyst situated downstream.

Advantageously, the profile of thermal power to be dissipated by the electric heating device in the cross section of the exhaust pipe 91 is determined as a function of the temperature profile of the exhaust gases at the inlet of the heating cellular structure, such that this profile is constant at the outlet of the matrix.

According to the non-limiting example shown in FIG. 2, the temperature profile of the gases at the inlet of the heating cellular structure is such that the gases situated at the center of the exhaust pipe have a higher temperature than those situated at the periphery of the pipe, this being linked to the influence of the ambient temperature on the temperature of the gases contained in the pipe, the thermal inertia of the pipe and the distribution of gases at the outlet of the engine or of a turbocharger of the engine. In this case, the cellular structure 20 is advantageously designed to have a peripheral portion designed to dissipate a thermal power P1, and a central portion designed to dissipate a thermal power P2, with P1 being greater than P2 so as to render the temperature of the gases at the outlet constant across the entire section.

It is possible to obtain portions which are designed to dissipate different thermal powers in different ways.

According to a first example, the cellular structure 20 may comprise portions formed of two different materials, having different electrical resistivities. For example, it is possible to select an FeCrAl Y alloy, M.N. 1.1767, with a resistivity equal to 1.44 ohm-meter at 20° C. and an Ni70Cr30 alloy, M.N. 2.4658, with a resistivity equal to 1.19 ohm-meter at 20° C.

As a variant, and with reference to FIG. 4A, variation in the thermal power dissipated by the cellular structure may be obtained by modifying the geometry of the panel 21 which is wound to obtain said structure. Advantageously, the panel 21 has a dimension d, in the direction of flow of the gases, which is variable. As schematically shown in FIG. 4A, electric current I flows in the panel 21 in a direction perpendicular to an axis X-X of winding of the panel (FIG. 4B), this axis being parallel to the direction of flow of the gases. Hence, a shorter distance in the direction of flow of the gases reduces the flow section of the electric current and makes it possible to increase the electrical resistance which is inversely proportional to the section of the panel that is traversed by the electric current. By increasing the electrical resistance of a section of the plate, the thermal power dissipated by the section is increased.

Thus, on the basis of a required profile of power to be dissipated as a function of a temperature profile upstream of the heating device, and of the mode of winding of the cellular panel 21 to obtain the structure 20, it is possible to identify zones of the panel the geometry of which has to be modified in order to have an impact on the thermal power dissipated.

Returning to the example described with reference to FIG. 2, in which the exhaust gases at the inlet of the heating cellular structure have a lower temperature at the periphery than the temperature at the center, one possible configuration for the cellular panel 21, as shown in FIG. 4B, is to have two end portions 210, in the direction of flow of electric current—that is to say a direction perpendicular to the direction of flow of the gases, which have a dimension d1 in the direction of flow of the gases that is reduced with respect to the dimension d2 of a central portion 211 situated between the end portions. Moreover, in this case, the cellular panel is advantageously wound about an axis X-X situated equidistantly from the two ends of reduced dimension d1, such that the end portions are located at the periphery of the cellular structure, as schematically shown in FIG. 2. Thus, the end portions can dissipate a greater thermal power P1, for the same electric current, than the thermal power P2 dissipated by the central portion, thus making it possible to obtain a homogeneous temperature profile T downstream of the heating device, which is greater than the effective catalysis temperature of the catalyst across its entire inlet section (zone Zok).

Figure 5:
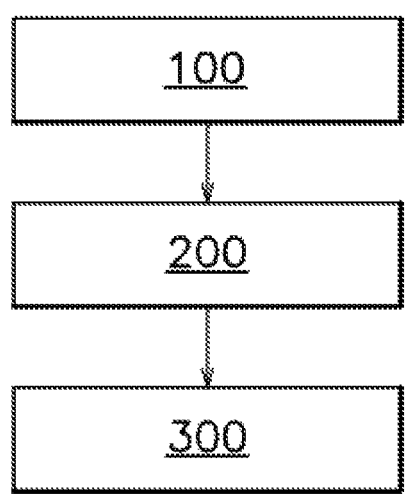
FIG. 5 schematically shows the main implementation steps of a method for designing a heating device according to one embodiment of the invention.

FIG. 5 schematically shows the main steps of a method for designing a heating device described above, said method comprising a first step 100 of determining an exhaust gas temperature profile in an exhaust pipe cross section, upstream of a heating device. This step makes it possible to determine the temperature differences that have to be compensated by the heating device in order to bring all the gases to an operating temperature of the catalyst.

A second step 200 comprises the determination of a profile of thermal power to be dissipated, in a section of the exhaust pipe upstream of the catalyst, by the heating cellular structure of the heating device described above, so as to obtain a constant temperature profile in the downstream direction. In one embodiment, this determination may take account of the velocity profile of the exhaust gases in the pipe, of thermal losses, etc. Since these parameters may vary as a function of the conditions of the engine, the determination can be carried out for various operating conditions of the engine so as to generate several thermal power profiles for the same engine, and several electric heating device designs for the same engine, thus making it possible at a later stage to select the conditions of the engine for which the thermal power profile, and therefore the electric heating device, is optimized.

Lastly, a third step 300 comprises the definition of zones of the heating cellular structure, the determination of a thermal power associated with each zone, and the dimensioning of each zone or the selection of an appropriate material to obtain the electrical resistance and the desired thermal power, in order to conform to the thermal power profile determined in step 200.

The invention claimed is:

1. An electric heating device for an exhaust gas catalyst, the electric heating device comprising:
    a sleeve; and
    a heating cellular structure which is heated by a flow of electric current and which is contained in the sleeve,
    the electric heating device being designed to be positioned in a segment of an exhaust gas pipe upstream of the exhaust gas catalyst, so as to completely occupy a cross section of said segment such that exhaust gases flowing in the exhaust gas pipe pass through a heating cellular structure before reaching the exhaust gas catalyst,
    the heating cellular structure is designed to dissipate an inhomogeneous thermal power in a section perpendicular to a direction of flow of the exhaust gases, such that a temperature of the exhaust gases at an outlet of the heating cellular structure is homogeneous in the section perpendicular to the direction of flow of the exhaust gases, wherein the heating cellular structure is obtained by winding a heating cellular panel about an axis corresponding to the direction of flow of the exhaust gases when the electric heating device is positioned in the exhaust pipe, and wherein the cellular panel has, along the axis, a variable dimension, and wherein the heating cellular panel has at least one first portion designed to form, once the heating cellular panel has been wound, a peripheral portion of the heating cellular structure, and at least one second portion designed to form, once the heating cellular panel has been wound, a central portion of the heating cellular structure, and said at least one first portion has a smaller dimension, in a direction of the axis of winding, than the dimension of the at least one second portion.

2. The heating device as claimed in claim 1, wherein the peripheral portion is designed to dissipate a first thermal power P1, and the central portion designed to dissipate a second thermal power P2, and wherein the first thermal power P1 is greater than the second thermal power P2.

3. The heating device as claimed in claim 1, wherein the heating cellular structure is composed of at least two materials having different electrical resistivities.

4. The heating device as claimed in claim 1, further comprising a catalysis element disposed in the sleeve, downstream of the heating cellular structure with respect to the direction of flow of the exhaust gases.

5. The heating device as claimed in claim 4, wherein the catalysis element is an oxidation catalyst, LNT, or three-way catalyst.

6. A catalysis assembly for exhaust gas, comprising at least one catalyst and the electric heating device as claimed in claim 1, wherein the at least one catalyst is selected from the group consisting of:
  a three-way catalyst,
  an oxidation catalyst,
  an LNT catalyst, and
  a selective catalytic reduction catalyst.

7. A vehicle comprising a combustion engine, an exhaust pipe for exhaust gases produced by combustion in the combustion engine, a catalyst disposed in the exhaust pipe, and the electric heating device as claimed in claim 1 disposed in the exhaust pipe upstream of the catalyst with respect to the direction of flow of the exhaust gases in the exhaust pipe.

8. A method for designing the heating device as claimed in claim 1, comprising measuring an exhaust gas temperature profile in a section of the exhaust gas pipe upstream of the catalyst,
  determining a profile of thermal power to be dissipated in a section of the exhaust pipe upstream of the catalyst so as to obtain a constant temperature profile at an inlet of the catalyst, and
  defining zones of the heating cellular structure of the heating device and the thermal power that can be dissipated by each zone, such that the heating of the exhaust gases by the heating cellular structure makes it possible to obtain the constant temperature profile of the exhaust gases at the inlet of the catalyst.

* * * * *